(12) United States Patent
Park et al.

(10) Patent No.: US 11,262,617 B2
(45) Date of Patent: Mar. 1, 2022

(54) DISPLAY APPARATUS

(71) Applicant: SAMSUNG ELECTRONICS CO., LTD., Suwon-si (KR)

(72) Inventors: Chunsoon Park, Suwon-s (KR); Seokwoo Yong, Suwon-si (KR); Youngchol Lee, Suwon-si (KR); Jonghoon Jung, Suwon-si (KR); Junsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/130,313

(22) Filed: Dec. 22, 2020

(65) Prior Publication Data
US 2021/0200027 A1    Jul. 1, 2021

(30) Foreign Application Priority Data
Dec. 27, 2019  (KR) .................. 10-2019-0175837

(51) Int. Cl.
G02F 1/13357    (2006.01)

(52) U.S. Cl.
CPC .. *G02F 1/133603* (2013.01); *G02F 1/133605* (2013.01); *G02F 1/133606* (2013.01); *G02F 1/133608* (2013.01)

(58) Field of Classification Search
CPC ......... G02F 1/133603; G02F 1/133605; G02F 1/133606
See application file for complete search history.

(56) References Cited

U.S. PATENT DOCUMENTS

| 2010/0033954 A1* | 2/2010 | Boonekamp | F21S 8/00 362/97.1 |
| 2014/0239326 A1 | 8/2014 | Perng | |
| 2016/0252775 A1* | 9/2016 | Lu | G02F 1/133605 362/97.1 |
| 2017/0219883 A1 | 8/2017 | Yin | |

FOREIGN PATENT DOCUMENTS

| KR | 1020050115493 A | 12/2005 |
| KR | 100665005 B1 | 1/2007 |
| KR | 1020090079929 A | 7/2009 |
| KR | 1020140011104 A | 1/2014 |

OTHER PUBLICATIONS

Communication dated May 7, 2021 issued by the European Intellectual Property Office in counterpart European Application No. 20216601.3.
Communication dated Aug. 10, 2021, issued by the European Patent Office in counterpart European Application No. 20216601.3.

* cited by examiner

*Primary Examiner* — Karabi Guharay
(74) *Attorney, Agent, or Firm* — Sughrue Mion, PLLC

(57) ABSTRACT

Provided is a display apparatus including a display panel, a light-emitting assembly disposed behind the display panel and including a light-emitting diode (LED) configured to emit light in a rear direction, and a reflective assembly disposed behind the light-emitting assembly and configured to reflect light emitted from the light-emitting assembly toward the display panel, wherein the reflective assembly includes a first area corresponding to the LED, and a second area adjacent to the first area, wherein at least one of a diffusion amount and a reflection amount of light exiting the second area is different from a corresponding one of a diffusion amount and a reflection amount of light exiting the first area.

19 Claims, 8 Drawing Sheets

DISPLAY APPARATUS

CROSS-REFERENCE TO RELATED APPLICATION

This application is based on and claims priority under 35 U.S.C. § 119 to Korean Patent Application No. 10-2019-0175837, filed on Dec. 27, 2019 in the Korean Intellectual Property Office, the disclosure of which is incorporated by reference herein in its entirety.

BACKGROUND

1. Field

The disclosure relates to a display apparatus with improved uniformity of light being incident to a display panel.

2. Description of the Related Art

A display apparatus is a type of output apparatus that visually displays images and data information, such as characters, figures, etc.

The display apparatus includes a self-emissive display panel such as organic light emitting diodes (OLEDs) or a non-emissive display panel such as a liquid crystal display (LCD).

A liquid crystal display apparatus includes a display panel for displaying a screen, and a backlight unit for supplying light to the display panel. Also, the liquid crystal display apparatus includes a reflective sheet for reflecting light radiated from the backlight unit to improve brightness of the display panel.

A backlight unit for supplying light to a display panel has been positioned toward the display panel. In such a display apparatus, an optical system, for example, a lens or an optical system having similar optical characteristics to a lens has been applied to improve uniformity of light being incident to the display panel, or a method of improving light uniformity by installing a large number of LEDs has been adopted.

SUMMARY

Provided is a display apparatus with improved light uniformity.

Provided is also a display apparatus capable of further improving light uniformity than a case in which light emitting diodes (LEDs) are mounted toward a front direction, by using the same number of LEDs as that used in the case.

Additional aspects will be set forth in part in the description which follows and, in part, will be apparent from the description, or may be learned by practice of the presented embodiments.

According to an aspect of an example embodiment, there is provided a display apparatus including a display panel, a light-emitting assembly disposed behind the display panel and including a light-emitting diode (LED) configured to emit light in a rear direction, and a reflective assembly disposed behind the light-emitting assembly and configured to reflect light emitted from the light-emitting assembly toward the display panel, wherein the reflective assembly includes a first area corresponding to the LED, and a second area adjacent to the first area, wherein at least one of a diffusion amount and a reflection amount of light exiting the second area is different from a corresponding one of a diffusion amount and a reflection amount of light exiting the first area.

The light-emitting assembly may further include a plurality of LEDs including the LED, wherein the light-emitting assembly may further including a transparent plate including a first surface facing the display panel and a second surface facing the reflective assembly, and wherein the plurality of LEDs may be disposed on the second surface.

The reflective assembly may further include a reflective plate on which a reflective sheet is disposed, and a sub reflective unit disposed on a surface of the reflective sheet that is opposite to the light-emitting assembly, the sub reflective unit being disposed to correspond to the LED, and wherein the sub reflective unit includes a first sub reflective unit, wherein the first area corresponds to a surface of the first sub reflective unit that is opposite to the LED, and a second sub reflective unit corresponding to the second area.

The sub reflective unit may have a cylinder shape.

In the sub reflective unit, a first diffusion amount of light exiting the first area may be different from a second diffusion amount of light exiting the second area, and wherein a first density of a light diffusing agent of the first sub reflective unit may be different from a second density of a light diffusing agent of the second sub reflective unit.

In the sub reflective unit, the first density of the light diffusing agent of the first sub reflective unit may be higher than the second density of the light diffusing agent of the second sub reflective unit.

In the sub reflective unit, a first reflection amount of the light exiting the first area may be different from a second reflection amount of the light exiting the second area, and wherein a first transmittance of the first sub reflective unit may be different from a second transmittance of the second sub reflective unit.

In the sub reflective unit, the first transmittance of the first sub reflective unit may be lower than the second transmittance of the second sub reflective unit.

In the sub reflective unit, a first incident angle of light being incident on the first area of the first sub reflective unit may be smaller than a second incident angle of light being incident on the second area of the second sub reflective unit, and wherein the first transmittance of the first sub reflective unit may be lower than the second transmittance of the second sub reflective unit.

The sub reflective unit may be a dichroic filter.

In the sub reflective unit, a first density of a diffusing agent of the first sub reflective unit may decrease in a radial direction from a center of the first area, and wherein a second transmittance of the second sub reflective unit may increase in the radial direction from the center of the first area.

The display apparatus may further include a supporter maintaining a distance between the light-emitting assembly and the reflective assembly, wherein a first end of the supporter is disposed on a surface of the reflective sheet that is opposite to the transparent plate, and wherein a second end of the supporter is inserted into a hole formed in the transparent plate that corresponds to the second end of the supporter.

The display apparatus may further include a supporter maintaining a distance between the light-emitting assembly and the reflective assembly, wherein a first end of the supporter is bonded on a surface of the transparent plate that is opposite to the reflective assembly, and wherein a second end of the supporter is inserted into a hole formed in the reflective sheet and the reflective plate that corresponds to the second end of the supporter.

The supporter may be made of a same material as the transparent plate.

According to an aspect of another example embodiment, there is provided a display apparatus including a display panel, a transparent plate disposed behind the display panel, a reflective sheet disposed behind the transparent plate, a plurality of light-emitting diodes (LEDs) disposed on a surface of the transparent plate facing the reflective sheet, and a diffuser disposed on a surface of the reflective sheet that is opposite to the transparent plate, the diffuser being disposed to correspond to each of the plurality of LEDs, wherein a density of a diffusing agent of the diffuser decreases in a radial direction from a center of the diffuser.

According to an aspect of another example embodiment, there is provided a display apparatus including a display panel, a transparent plate disposed behind the display panel, a reflective sheet disposed behind the transparent plate, a plurality of light-emitting diodes (LEDs) disposed on a surface of the transparent plate facing the reflective sheet, and a reflection aiding unit disposed on a surface of the reflective sheet that is opposite to the transparent plate, the reflection aiding unit being disposed to correspond to each of the plurality of LEDs, wherein a reflection amount of light exiting the reflection aiding unit increases in a radial direction from a center of the reflection aiding unit.

A transmittance of the reflection aiding unit may increase in the radial direction from the center of the reflection aiding unit.

A transmittance of the reflection aiding unit may increase as an incident angle of light emitted from each of the plurality of LEDs increases.

The reflection aiding unit may be a dichroic filter.

The reflection aiding unit may have a cylinder shape.

According to an aspect of another example embodiment, there is provided a display apparatus including a display panel, a light-emitting assembly disposed behind the display panel, the light-emitting assembly including a transparent plate and a plurality of light-emitting diodes (LEDs) disposed on a rear surface of the transparent plate, and a reflective assembly disposed behind the light-emitting assembly and configured to reflect light emitted from the light-emitting assembly toward the display panel, wherein the reflective assembly includes a reflective sheet, a plurality of first sub reflective units disposed on a front surface of the reflective sheet corresponding to the plurality of LEDs, and a plurality of second sub reflective units disposed on the front surface of the reflective sheet and adjacent to the plurality of first sub reflective units, wherein at least one of a diffusion amount and a reflection amount of light exiting each of the plurality of first sub reflective units is different from a corresponding one of a diffusion amount and a reflection amount of light exiting each of the plurality of first sub reflective units.

A first density of a light diffusing agent of each of the plurality of first sub reflective units may be different from a second density of a light diffusing agent of each of the plurality of second sub reflective units.

A first transmittance of each of the plurality of first sub reflective units may be different from a second transmittance of each of the plurality of second sub reflective units.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
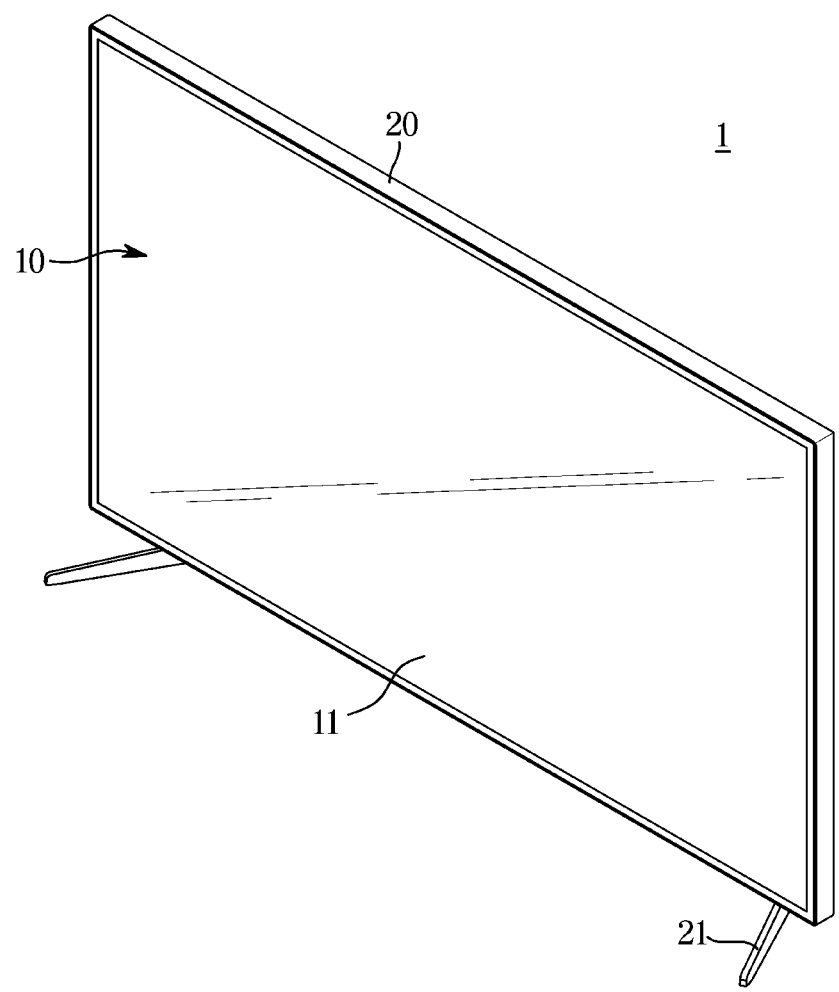
FIG. 1 is a perspective view schematically showing a display apparatus according to an embodiment.

Configurations illustrated in the embodiments and the drawings described in the present disclosure are examples, and thus it is to be understood that various modified examples, which may replace the embodiments and the drawings described in the present disclosure, are possible when filing the present application.

Also, like reference numerals or symbols denoted in the drawings of the present specification represent members or components that perform the substantially same functions.

The terms used in the present disclosure are merely used to describe embodiments, and are not intended to limit the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the teachings of this disclosure. As used herein, the term "and/or" includes any and all combinations of one or more of associated listed items.

In the following description, the terms "up-down direction", "lower portion", "front-back direction", etc. are defined based on the drawings, and the shapes and positions of the corresponding components are not limited by the terms.

Throughout the disclosure, the expression "at least one of a, b and c" indicates only a, only b, only c, both a and b, both a and c, both b and c, all of a, b, and c, or variations thereof.

More specifically, referring to FIG. 1, a direction in which a display apparatus 1 displays a screen for a user is defined as a front direction, and a rear direction, left and right sides, and upper and lower sides are defined based on the front direction.

Hereinafter, embodiments of the disclosure will be described in detail with reference to the accompanying drawings.

Figure 2:
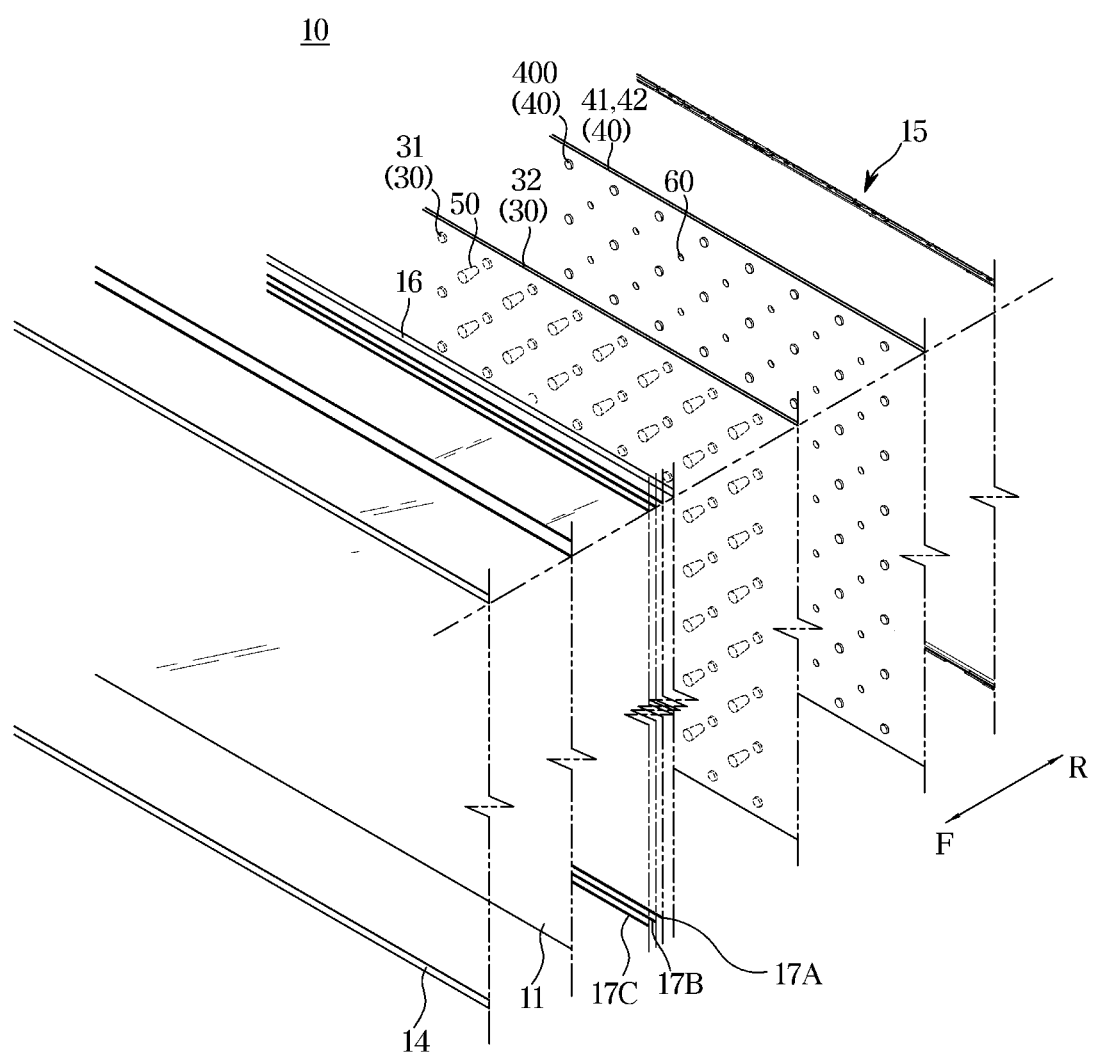
FIG. 2 is an exploded perspective view of a display module applied to a display apparatus according to an embodiment.

Referring to FIGS. 1 and 2, the display apparatus 1 may include a display module 10 configured to display images. The display module 10 may have at least one shape of a flat shape or a curved shape according to a kind of the display apparatus 1. That is, when the display apparatus 1 is a flat type television as shown in FIG. 1, the display module 10 may have a flat shape. When the display apparatus 1 is a curved television, the display module 10 may have a curved shape. When the display apparatus 1 is a flexible television, the display module 10 may change between a flat shape and a curved shape.

The display apparatus 1 may further include a case 20 for accommodating the display module 10 and various electronic parts.

The case 20 may be attached to the display module 10 from behind. The case 20 may include a stand 21 for enabling the display apparatus 1 to stand.

Also, the display apparatus 1 may be fixed on a wall through a wall-mount bracket mounted on the wall, instead of the stand 21. The wall-mount bracket may be detachably coupled to the case 20.

Inside the case 20, a power board configured to supply power to the display apparatus 1, a signal processing board configured to process various images and sound signals, and a timing control board configured to transmit image signals to a display panel 11 may be installed.

As shown in FIG. 2, the display module 10 may include the display panel 11 which may be a liquid crystal panel.

The display module 10 may further include a light-emitting unit 30, e.g., a light-emitting assembly, positioned behind the display panel 11 to supply light to the display panel 11. The light emitting unit 30 may include a transparent plate 32 and a plurality of light-emitting diodes (LEDs) 31. Details about the light-emitting unit 30 will be described later.

The display module 10 may further include a reflective unit 40, e.g., a reflective assembly, positioned behind the light emitting unit 30. The reflective unit 40 may reflect light emitted from the light-emitting unit 30 toward the display panel 11. The reflective unit 40 may include a reflective sheet 41, and a reflective plate 42 supporting the reflective sheet 41. In a related display apparatus, a light-emitting unit emits light toward a display panel. However, according to an embodiment, a structure in which the light-emitting unit 30 emits light toward a rear direction which is opposite to a direction in which the display panel 11 is positioned and the reflective unit 40 reflects the light toward the display panel 11 may be provided. Technical effects obtained by the structure will be described later.

The reflective unit 40 may be coupled to a rear chassis 15. The display module 10 may further include a front chassis 14 covering edges of the display panel 11 and coupled to a front portion of the rear chassis 14. The rear chassis 15 may cover a rear side of the display panel 11.

The display module 10 may further include a diffuser sheet 16. For example, the diffuser sheet 16 may be in a shape of a flat sheet. The diffuser sheet 16 may be positioned between the display panel 11 and the light-emitting unit 30 to further diffuse light reflected from the reflective unit 40.

In front of the diffuser sheet 16, a re-diffuser sheet 17a, a prism sheet 17b, and a protective sheet 17c may be positioned.

The re-diffuser sheet 17a may be opposite to the diffuser sheet 16 to again diffuse light that has passed through the diffuser sheet 16. The prism sheet 17b may be positioned in front of the re-diffuser sheet 17a to concentrate light diffused by the re-diffuser sheet 17a in a direction that is perpendicular to the display panel 11. The prism sheet 17b may include a pattern having a prism shape. The protective sheet 17c may be positioned in front of the prism sheet 17b to protect the prism sheet 17b.

However, the above-described internal structure of the display module 10 is an example, and an arrangement of the sheets 16, 17a, 17b, and 17c may change.

A front chassis 14 may be coupled to edges of the rear chassis 15. The front chassis 14 may maintain a stacked structure of the display module 10.

Figure 3:
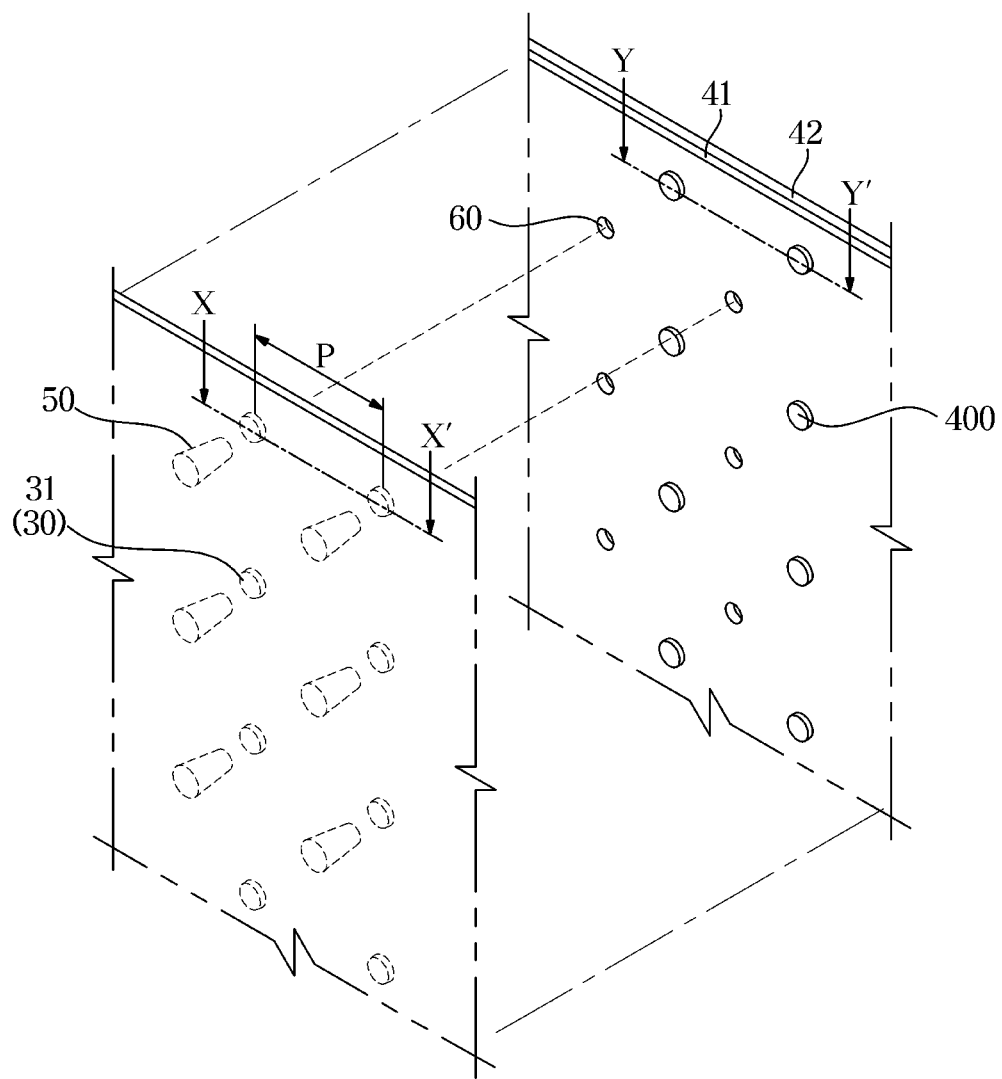
FIG. 3 is a partially enlarged view showing a light-emitting unit and a reflective unit of FIG. 2.

Hereinafter, the light-emitting unit 30 will be described with reference to FIG. 3. FIG. 3 is a partially enlarged view showing the light-emitting unit 30 and the reflective unit 40 of FIG. 2.

As shown in FIG. 2, the diffuser sheet 16 may be positioned behind the display panel 11. The light-emitting unit 30 may be positioned behind the diffuser sheet 16. The reflective unit 40 may be positioned behind the light-emitting unit 30. The rear chassis 15 may be positioned behind the reflective unit 40, and the rear chassis 15 may be coupled to the reflective unit 40 to support the reflective unit 40.

The light-emitting unit 30 may include the LEDs 31 configured to generate light to be supplied to the display panel 11, and the transparent plate 32. The plurality of LEDs 31 may be mounted on the transparent plate 32.

In a related display apparatus, a light-emitting unit among components constituting a display module may be positioned at a relatively rear area to radiate light to a display panel. The light-emitting unit is detachably coupled to a rear chassis. For example, a plurality of LEDs are mounted on a plurality of boards. The boards are coupled to the rear chassis and face the display panel. Each board is in a shape of a bar extending in a longitudinal direction of the rear chassis, and the boards are spaced in an up-down direction on the rear chassis. Alternatively, a plurality of LEDs are mounted on a plate-shaped board.

Figure 4:
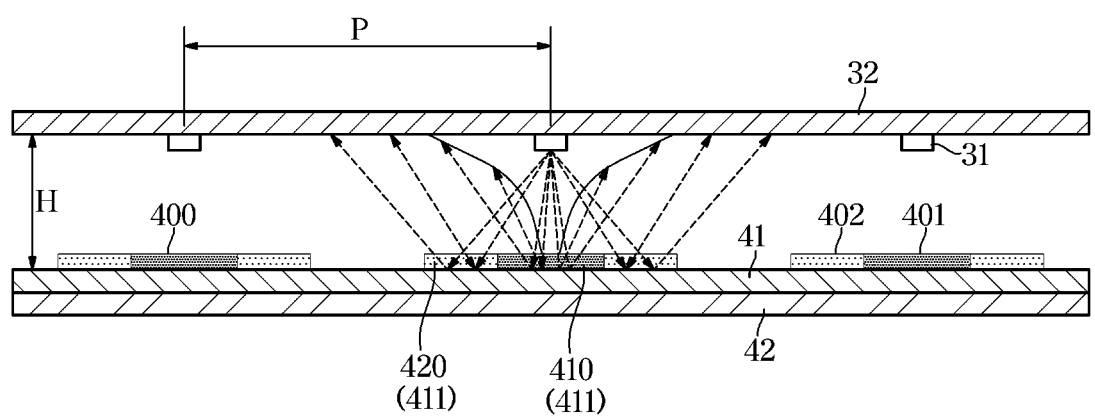
FIG. 4 is a cross-sectional view of a display apparatus according to an embodiment, taken along lines X-X' and Y-Y' of FIG. 3.

Referring to FIGS. 2 and 3, in the light-emitting unit 30, the plurality of LEDs 31 may be mounted on the transparent plate 32 in a longitudinal direction of the rear chassis 15, similar to a related display apparatus in which the LEDs are mounted on the plurality of boards. The LEDs 31 may be spaced along the longitudinal direction of the rear chassis 15 at a pitch P as shown in FIGS. 3 and 4. As shown in FIG. 2, the plurality of LEDs 31 extending in the longitudinal direction may be arranged in a plurality of columns on the transparent plate 32. In FIG. 2, 8 columns are shown, however, the number of columns extending in the up-down direction may change.

As a method for mounting the LEDs 31 on the transparent plate 32 or implementing the LEDs 31 as a circuit on the transparent plate 32 to control the LEDs 31 and supply power to the LEDs 31, a surface mount device (SMD) method or a chip on board (COB) method that is different from the SMD method may be applied. When the transparent plate 32 is a hard printed circuit board (PCB), the SMD method may be mainly applied, whereas when the transparent plate 32 is a flexible board, the LEDs 31 may be more easily mounted by the COB method.

A structure for mounting the LEDs 31 on the transparent plate 32 by the COB method will be briefly described below. The LEDs 31 may be arranged on the transparent plate 32 or a transparent sheet. The transparent plate 32 may include a connecting electrode connected to the LEDs 31, and a transparent electrode connected to the connecting electrode and implementing an electrical pattern on the transparent plate 32. A conductor of the transparent plate 32 may be formed based on indium tin oxide (ITO) which is a transparent conductor.

The transparent plate 32 may be made of polycarbonate (PC), poly vinyl chloride (PVC), or polyethylene terephthalate (PET). According to an embodiment, the transparent plate 32 may be made of a high heat-resistant material, such as polyethylene naphthalate (PEN), poly amide (PA), poly imide (PI). The transparent plate 32 may transmit light reflected from the reflective unit 40 based on the material to cause the light to be incident to the display panel 11.

Referring to FIGS. 2 and 3, the LEDs 31 mounted on the transparent plate 32 may be arranged toward the reflective unit 40 positioned behind the transparent plate 32. For example, the light-emitting unit 30 may include the transparent plate 32 including a first surface facing the display panel 11 in a F direction as shown in FIG. 2 and a second surface facing the reflective unit 40 in a R direction as shown in FIG. 2. The LEDs 31 may be mounted on the second surface facing the reflective unit 40.

In a related method, a large number of LEDs are installed or an optical system such as a lens is used together with LEDs to improve uniformity of light being incident to a display panel. However, the related method increases manufacturing cost and requires a complicated manufacturing process, resulting in low mass production. Light uniformity may also be improved by increasing a distance between a display panel and a light-emitting unit. However, because the method of increasing the distance between the display panel and the light-emitting unit increases the volume and thickness of a display apparatus, the method may not be suitable for a thin display apparatus.

According to an arrangement structure of the light-emitting unit 30 and the reflective unit 40 according to an embodiment, light uniformity may be improved without increasing the number of LEDs or using a separate optical system. For example, referring to FIGS. 3 and 4, the plurality of LEDs 31 mounted on the transparent plate 32 may face the reflective unit 40 positioned behind the transparent plate 32, while being spaced by a distance H from the reflective unit 40.

Light radiated from the light-emitting unit 30 in an opposite direction of the direction in which the display panel 11 is positioned may travel along a reflection path, such that an optical distance substantially increases by the distance H. Due to the optical distance increased by the distance H, an effect of light radiated from the light-emitting unit 30 spreading more widely may be achieved, which may lead to an improvement of uniformity of light being incident to the display panel 11.

Hereinafter, a relationship between light radiated from the LEDs 31 and the reflective sheet 41 will be described with reference to FIG. 4.

Light radiated from each LED 31 may be a surface light source. For example, light radiated from each LED 31 may reach the reflective sheet 41 at different incident angles. An incident angle of light radiated from each LED 31 reaching the reflective sheet 41 may increase as a distance from a point at which a vertical line drawn from the LED 31 meets the reflective sheet 41 increases. Light radiated from the LED 31 may reach the reflective sheet 41 while maintaining a sphere form as a point light source, and after the light reaches the reflective sheet 41, the light reflected by the reflective sheet 41 may also maintain a sphere form and be emitted toward the display panel 11. Even in the structure of reflecting light emitted from the light-emitting unit 30 toward the display panel 11 by positioning the reflective unit 40 behind the light-emitting unit 30, an illuminance difference may occur in the diffuser sheet 16 or the display panel 11.

Hereinafter, a structure of the reflective unit 40 and a method of improving light uniformity will be described with reference to FIGS. 4 to 6.

FIG. 4 is a cross-sectional view of the display apparatus 1 according to an embodiment, taken along lines X-X' and Y-Y' of FIG. 3. FIG. 5 is a cross-sectional view of the display apparatus 1 according to another embodiment, taken along lines X-X' and Y-Y' of FIG. 3. FIG. 6 is a cross-sectional view of the display apparatus 1 according to still another embodiment, taken along lines X-X' and Y-Y' of FIG. 3.

Figure 5:
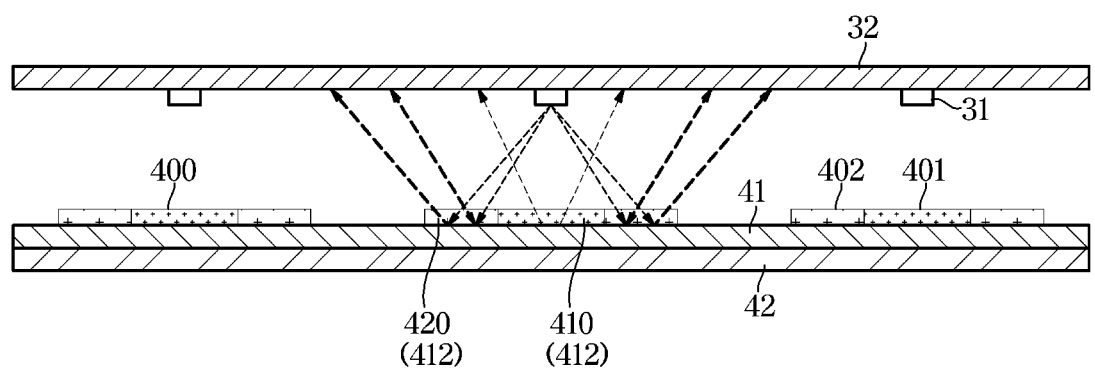
FIG. 5 is a cross-sectional view of a display apparatus according to another embodiment, taken along lines X-X' and Y-Y' of FIG. 3.
Figure 6:
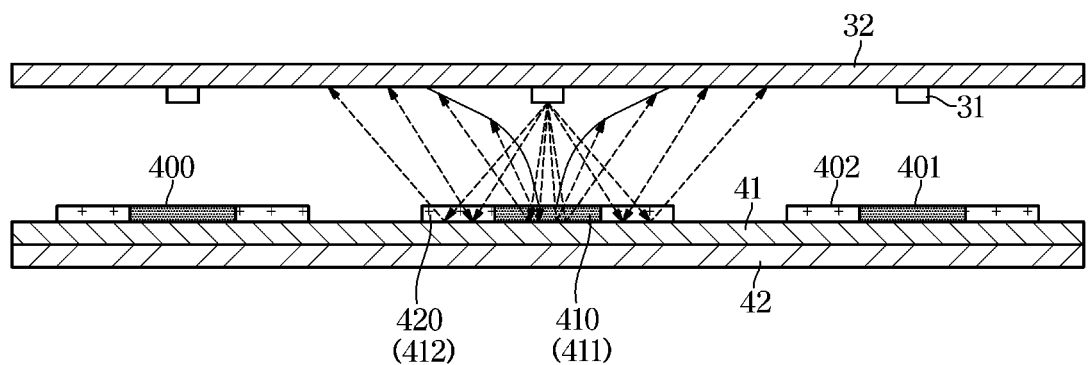
FIG. 6 is a cross-sectional view of a display apparatus according to still another embodiment, taken along lines X-X' and Y-Y' of FIG. 3.

Referring to FIGS. 4 to 6, the reflective unit 40 may be opposite to the light-emitting unit 30 including the LEDs 31 positioned behind the display panel 11 to emit light in the rear direction. For example, the reflective unit 40 may be positioned behind the light-emitting unit 30 to reflect light emitted from the light-emitting unit 30 toward the display panel 11. The reflective unit 40 may include the reflective sheet 41 to reflect light emitted from the light-emitting unit 30 toward the display panel 11. The reflective unit 40 may further include the reflective plate 42 positioned behind the reflective sheet 41 to support the reflective sheet 41. Because the reflective plate 42 supports the reflective sheet 41, the reflective plate 42 may be made of a material that is different from the reflective sheet 41. The reflective plate 42 may be detachably coupled to the rear chassis 15.

The reflective unit 40 may include a first area 401 corresponding to each LED 31, and a second area 402 surrounding or adjacent to the first area 401. To improve light uniformity, at least one of a light diffusion amount or a light reflection amount of the second area 402 may be different from the light diffusion amount or the light reflection amount of the first area 401.

For example, the first area 401 and the second area 402 may be formed on a sub reflective unit 400. The sub reflective unit 400 may be provided on a surface of the reflective sheet 41 which is facing the light-emitting unit 30. The sub reflective unit 400 may be provided on the reflective sheet 41 to correspond to each of the LEDs 31.

The sub reflective unit 400 may include a first sub reflective unit 410 and a second sub reflective unit 420. The first area 401 may be provided on a surface of the first sub reflective unit 410, which is opposite to the light-emitting unit 30. In the second sub reflective unit 420, the second area 402 may surround the first area 401. Light reflected from the reflective sheet 41 may travel from any one area of the first area 401 or the second area 402 toward the display panel 11.

The sub reflective unit 400 may be in a shape of a cylinder. For example, the sub reflective unit 400 may be positioned on the reflective sheet 41 to correspond to each of the LEDs 31 mounted on the transparent plate 32. As shown in FIG. 3, the sub reflective unit 400 may be in a shape of a coin. Although the sub reflective unit 400 is in a shape of a cylinder, a height of the sub reflective unit 400 from the reflective sheet 41 may be smaller than a diameter of a circular surface including the first area 401 and the second area 402 that are opposite to the LED 31. A shape of the sub reflective unit 400 shown in FIGS. 2 and 3 is a cylinder shape and a shape of the surface of the sub reflective unit 400 that is opposite to the LED 31 is a circle. However, the shape of the sub reflective unit 400 is not limited to the shape shown in FIGS. 2 and 3, and the sub reflective unit 400 may have various shapes.

Referring to FIG. 4, in the sub reflective unit 400, a diffusion amount of light exiting the first area 401 may be different from a diffusion amount of light of light exiting the second area 402. For example, in the sub reflective unit 400, a density of a diffusing agent of the first sub reflective unit 410 may be different from a density of a diffusing agent of the second sub reflective unit 420. The sub reflective unit 400 having different densities of diffusing agents may be a diffuser unit 411.

As a diffusing agent that is applied to the sub reflective unit 400, a material capable of providing a light diffusing characteristic without damaging brightness of a light source or the reflective sheet 41 as much as possible may be used. As a diffusing agent that is applied to the sub reflective unit 400, a material obtained by adding an inorganic, acrylic, and/or silicon light diffusing agent to a transparent thermoplastic resin such as a transparent polycarbonate resin may be used. However, embodiments are not limited thereto. For example, a high-density polyethylene (HDPE) light diffusing agent having a high molecular weight and high density may be used. As the density of the light diffusing agent increases, a diffusing characteristic of light exiting the sub reflective unit 400 may increase accordingly.

In the sub reflective unit 400, the density of the diffusing agent of the first sub reflective unit 410 may be higher than the density of the diffusing agent of the second sub reflective unit 420. The reflective unit 40 may have a structure of reflecting light emitted from the light-emitting unit 30 toward the display panel 11. Because the density of the diffusing agent of the first sub reflective unit 410 is higher than the density of the diffusing agent of the second sub reflective unit 420, light reflected from the reflective sheet 41 and exiting the first area 401 may be further diffused than light exiting the second area 402. For example, light exiting the first area 401 may be further diffused than light exiting the second area 402 to reinforce light exiting the second area 402. Accordingly, uniformity of light passing through the transparent plate 32 of the light-emitting unit 30 may be secured. When the sub reflective unit 400 in which the density of the diffusing agent of the first sub reflective unit 410 is higher than the density of the diffusing agent of the second sub reflective unit 420 is positioned on the reflective sheet 41, light uniformity may be further improved than when the reflective sheet 41 is used alone.

The density of the diffusing agent of the sub reflective unit 400 may decrease as a distance from a point at which a vertical line drawn from the LED 31 meets the reflective sheet 41 to the sub reflective unit 400 increases. Because the density of the diffusing agent is higher at a location closer to the point at which the vertical line drawn from the LED 31 meets the reflective sheet 41, light reflected at the closer location may be further diffused to exit the sub reflective unit 400. When the sub reflective unit 400 is positioned on the reflective sheet 41 and the sub reflective unit 400 has a lower density of the diffusing agent at a longer distance from the point at which the vertical line drawn from the LED 31 meets the reflective sheet 41, light uniformity may be further improved than when the reflective sheet 41 is used alone.

Referring to FIG. 5, in the sub reflective unit 400, a reflection amount of light exiting the first area 401 may be different from a reflection amount of light exiting the second are 402. For example, in the sub reflective unit 400, transmittance of the first sub reflective unit 410 may be different from transmittance of the second sub reflective unit 420. The sub reflective unit 400 having different transmittance may be a reflection aiding unit 412.

A dichroic filter may be used to make transmittance of the first sub reflective unit 410 different from transmittance of the second sub reflective unit 420. The dichroic filter may adjust an optical characteristic through a repeated layered structure using differences in density of a material applied to the filter. Reflectance for each wavelength may be adjusted by adjusting thicknesses of layers of the repeated layered structure. For example, the repeated layered structure may have a predefined optical characteristic by alternately layering a low refractive material and a high refractive material. A filter formed as a repeated layered structure may adjust transmittance according to an incident angle by using spectral transmittance characteristics that are shifted to a shorter wavelength (higher frequency) at a greater incident angle.

The transmittance of the first sub reflective unit 410 may be lower than the transmittance of the second sub reflective unit 420. The reflective unit 40 may be formed as a structure configured to reflect light emitted from the light-emitting unit 30 toward the display panel 11. When the transmittance of the first sub reflective unit 410 is lower than the transmittance of the second sub reflective unit 420, light reflected from the reflective sheet 41 and exiting the first area 401 may exit with lower reflectance than light exiting the second area 402. When the sub reflective unit 400 in which the transmittance of the first sub reflective unit 410 is lower than the transmittance of the second sub reflective unit 420 is positioned on the reflective sheet 41, light uniformity may be further improved than when the reflective sheet 41 is used alone.

A transmittance of the sub reflective unit 400 may increase as a distance from the point at which the vertical line drawn from the LED 31 meets the reflective sheet 41 to the sub reflective unit 400 increases. For example, the sub reflective unit 400 may have higher transmittance at a greater incident angle of light being incident from the LED 31. Because the sub reflective unit 400 has lower light transmittance at a closer location to the point at which the vertical line drawn from the LED 31 meets the reflective sheet 41, light exiting the sub reflective unit 400 at the closer location to the point may be further suppressed. When the sub reflective unit 400 having higher transmittance at a longer distance from the point at which the vertical line drawn from the LED 31 meets the reflective sheet 41 is positioned on the reflective sheet 41, light uniformity may be further improved than when the reflective sheet 41 is used alone.

Referring to FIG. 6, in the sub reflective unit 400, the density of the diffusing agent of the first sub reflective unit 410 may be reduced in a radial direction from a center of the first area 401. In the sub reflective unit 400, the transmittance of the second reflective unit 420 may increase in the radial direction from the center of the first area 401. For example, the embodiment shown in FIG. 4 may be applied to the first sub reflective unit 410, and the embodiment shown in FIG. 5 may be applied to the second sub reflective unit 420. However, embodiments are not limited thereto. For example, the embodiment shown in FIG. 5 may be applied to the first sub reflective unit 410, and the embodiment shown in FIG. 4 may be applied to the second sub reflective unit 420.

Hereinafter, an arrangement of supporters 50 will be described with reference to FIGS. 7 and 8.

The display module 10 may further include the supporters 50 configured to maintain the distance H (see FIG. 4) between the light-emitting unit 30 and the reflective unit 40. As shown in FIGS. 7 and 8, each supporter 50 may be in a shape of a truncated cone. The supporter 50 may be made of the same material as the transparent plate 32 such that light reflected from the reflective unit 40 is transmitted through the supporter 50 to arrive at the display panel 11. One end of the supporter 50 with a larger diameter of a cross section of the truncated cone may be bonded on a surface of the reflective sheet 41, which is opposite to the transparent plate 32. A bonding sheet may be additionally provided between the supporter 50 and the reflective sheet 41. The supporter 50 may be bonded on the reflective sheet 41 through the bonding sheet. The bonding sheet may have an adhesive property and be transparent without any discolorations. Also, the bonding sheet may have a thermosetting property.

In the transparent plate 32, a hole 30 corresponding to the other end of the supporter 50 may be formed. The other end of the supporter 50 may be inserted into the hole 60. Because the supporter 50 is in the shape of a truncated cone, the supporter 50 may be fixed at the transparent plate 32 at a position at which a diameter of a cross section of the truncated cone is identical to a diameter of the hole 60 after the supporter 50 is inserted into the hole 60 by a predefined depth. When the supporter 50 is fixed at the transparent plate 32, the distance H (see FIG. 4) between the light-emitting unit 30 and the reflective unit 40 may be maintained.

However, embodiments are not limited thereto. For example, the one end with the larger diameter of a cross section of the truncated cone of the supporter 50 may be bonded on a surface of the transparent plate 32, which is opposite to the reflective unit 40. The supporter 50 may be bonded on the transparent plate 32 through a bonding sheet as described above.

Figure 8:
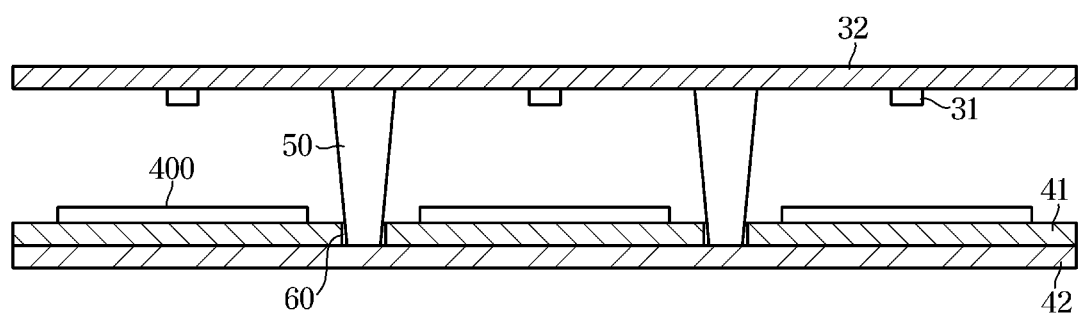
FIG. 8 is a cross-sectional view showing an arrangement of supporters and holes in a display apparatus according to another embodiment.

As shown in FIG. 8, the hole 60 corresponding to the other end with a smaller diameter of a cross section of the truncated cone of the supporter 50 may be formed in the reflective sheet 41. FIG. 8 shows a case in which no hole 60 is formed in the reflective plate 42, however, the hole 60 may be formed in both the reflective sheet 41 and the reflective plate 42 according to a manufacturing process.

Figure 7:
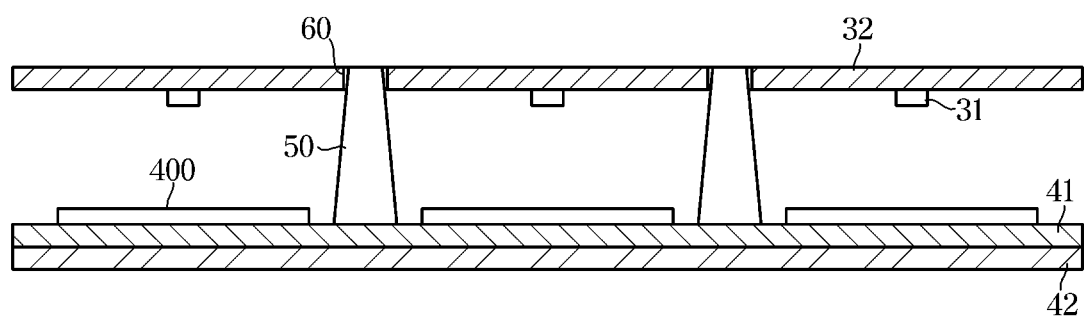
FIG. 7 is a cross-sectional view showing an arrangement of supporters and holes in a display apparatus according to an embodiment.

In the embodiment shown in FIG. 8, the other end of the supporter 50 may be inserted into the hole 60, similar to the embodiment shown in FIG. 7. Because the supporter 50 is in the shape of a truncated cone, the supporter 50 may be fixed at the reflective sheet 41 and the reflective plate 42 at a position at which the diameter of the cross section of the truncated cone is identical to the diameter of the hole 60 after the supporter 50 is inserted into the hole 60 by a predefined depth. When the supporter 50 is fixed at the reflective sheet 41 and the reflective plate 42, the distance H (see FIG. 4) between the light-emitting unit 30 and the reflective unit 40 may be maintained.

According to embodiments, because light radiated from the light-emitting unit toward an opposite direction of a direction in which the display panel is positioned travels along a reflection path such that an optical distance substantially increases, the display apparatus with improved uniformity of light being incident to the display panel may be provided.

According to embodiments, by adjusting a diffusion amount or a reflection amount of light exiting the sub reflective unit mounted on the reflective unit according to areas, the display apparatus with improved uniformity of light being incident to the display panel may be provided.

Although embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display panel;
a light-emitting assembly disposed behind the display panel and comprising a light-emitting diode (LED) configured to emit light in a rear direction; and
a reflective assembly disposed behind the light-emitting assembly and configured to reflect the light emitted from the light-emitting assembly toward the display panel,
wherein the reflective assembly comprises:
a reflective sheet; and
a sub reflective unit disposed on a surface of the reflective sheet that is opposite to the light-emitting assembly, the sub reflective unit being disposed to correspond to the LED,
wherein the sub reflective unit comprises:
a first sub reflective unit disposed in a first area of the sub reflective unit corresponding to the LED; and
a second sub reflective unit corresponding to a second area adjacent to the first area, and
wherein at least one of a diffusion amount and a reflection amount of light exiting the second area is different from a corresponding one of a diffusion amount and a reflection amount of light exiting the first area.

2. The display apparatus according to claim 1, wherein the light-emitting assembly further comprises a plurality of LEDs including the LED,
wherein the light-emitting assembly further comprises a transparent plate including a first surface facing the display panel and a second surface facing the reflective assembly, and
wherein the plurality of LEDs are disposed on the second surface.

3. The display apparatus according to claim 2, wherein the reflective assembly further comprises:
a reflective plate on which the reflective sheet is disposed, and
wherein the first area corresponds to a surface of the first sub reflective unit that is opposite to the LED.

4. The display apparatus according to claim 3, wherein the sub reflective unit has a cylinder shape.

5. The display apparatus according to claim 3, wherein, in the sub reflective unit, a first diffusion amount of light exiting the first area is different from a second diffusion amount of light exiting the second area, and
wherein a first density of a light diffusing agent of the first sub reflective unit is different from a second density of a light diffusing agent of the second sub reflective unit.

6. The display apparatus according to claim 5, wherein, in the sub reflective unit, the first density of the light diffusing agent of the first sub reflective unit is higher than the second density of the light diffusing agent of the second sub reflective unit.

7. The display apparatus according to claim 3, wherein, in the sub reflective unit, a first reflection amount of the light exiting the first area is different from a second reflection amount of the light exiting the second area, and
wherein a first transmittance of the first sub reflective unit is different from a second transmittance of the second sub reflective unit.

8. The display apparatus according to claim 7, wherein, in the sub reflective unit, the first transmittance of the first sub reflective unit is lower than the second transmittance of the second sub reflective unit.

9. The display apparatus according to claim 8, wherein the sub reflective unit is a dichroic filter.

10. The display apparatus according to claim 7, wherein, in the sub reflective unit, a first incident angle of light being incident on the first area of the first sub reflective unit is smaller than a second incident angle of light being incident on the second area of the second sub reflective unit, and
wherein the first transmittance of the first sub reflective unit is lower than the second transmittance of the second sub reflective unit.

11. The display apparatus according to claim 3, wherein, in the sub reflective unit, a first density of a diffusing agent of the first sub reflective unit decreases in a radial direction from a center of the first area, and
wherein a second transmittance of the second sub reflective unit increases in the radial direction from the center of the first area.

12. The display apparatus according to claim 3, further comprising:
a supporter maintaining a distance between the light-emitting assembly and the reflective assembly,
wherein a first end of the supporter is disposed on a surface of the reflective sheet that is opposite to the transparent plate, and
wherein a second end of the supporter is inserted into a hole formed in the transparent plate that corresponds to the second end of the supporter.

13. The display apparatus according to claim 12, wherein the supporter is made of a same material as the transparent plate.

14. The display apparatus according to claim 3, further comprising:
a supporter maintaining a distance between the light-emitting assembly and the reflective assembly,
wherein a first end of the supporter is bonded on a surface of the transparent plate that is opposite to the reflective assembly, and
wherein a second end of the supporter is inserted into a hole formed in the reflective sheet and the reflective plate that corresponds to the second end of the supporter.

15. A display apparatus comprising:
a display panel;
a transparent plate disposed behind the display panel;
a reflective sheet disposed behind the transparent plate;
a plurality of light-emitting diodes (LEDs) disposed on a surface of the transparent plate facing the reflective sheet; and
a diffuser disposed on a surface of the reflective sheet that is opposite to the transparent plate, the diffuser being disposed to correspond to each of the plurality of LEDs,
wherein a density of a diffusing agent comprising a material to diffuse light that is included in the diffuser decreases in a radial direction from a center of the diffuser.

16. A display apparatus comprising:
a display panel;
a transparent plate disposed behind the display panel;
a reflective sheet disposed behind the transparent plate;
a plurality of light-emitting diodes (LEDs) disposed on a surface of the transparent plate facing the reflective sheet; and
a reflection aiding unit disposed on a surface of the reflective sheet that is opposite to the transparent plate, the reflection aiding unit being disposed to correspond to each of the plurality of LEDs,
wherein a reflection amount of light exiting the reflection aiding unit increases in a radial direction from a center of the reflection aiding unit, and
wherein a transmittance of the reflection aiding unit increases in the radial direction from the center of the reflection aiding unit.

17. The display apparatus according to claim 16, wherein the transmittance of the reflection aiding unit increases as an incident angle of light emitted from each of the plurality of LEDs increases.

18. The display apparatus according to claim 16, wherein the reflection aiding unit is a dichroic filter.

19. The display apparatus according to claim 16, wherein the reflection aiding unit has a cylinder shape.

* * * * *